United States Patent Office 3,574,196
Patented Apr. 6, 1971

3,574,196
STEROIDAL 1,4-DIENES
Theodore J. Foell, King of Prussia, Richard W. Rees, Newtown Square, and Herchel Smith, Wayne, Pa., assignors to American Home Products Corporation, New York, N.Y.
No Drawing. Continuation-in-part of application Ser. No. 544,800, Apr. 25, 1966. This application Mar. 13, 1967, Ser. No. 622,468
Int. Cl. C07c 169/14, 169/26
U.S. Cl. 260—239.55           34 Claims

ABSTRACT OF THE DISCLOSURE

Steroids with Δ-1,4 A rings unsubstituted in the 3-position (I) and having adrenocortical, progestational, androgenic and anabolic activity are provided by reducing steroidal Δ-1,4-3-ols (II) or- acylates (III). Compounds (II) are provided by reducing steroidal Δ-1,4-3-ones (IV) with aluminum hydride in the cold. Compounds (I) also are provided by reducing compounds (IV) with warm aluminum hydride and separating them from 1,3- and 2,4-diene byproducts by selective reduction of the byproducts with lithium in ammonia.

---

This application is a continuation-in-part of copending application, Ser. No. 544,800, filed Apr. 25, 1966, and now abandoned.

This invention relates to novel compositions of matter classified in the art of chemistry as 1,4-diene steroids, and to novel processes for their preparation.

The present invention in its principal composition aspect resides in the concept of a 1,4-diene steroid having an unsubstituted 3-position.

The present invention in one of its principal process aspects resides in the concept of selectively reducing a steroidal 1,4-dien-3-ol or -3-one to obtain a steroidal 1,4-diene unsubstituted in the 3-position.

The present invention in another of its principal process aspects resides in the concept of acylating a steroidal 1,4-dien-3-ol, and selectively hydrogenolyzing the resulting ester to obtain a steroidal 1,4-diene unsubstituted in the 3-position.

The present invention also provides certain new 3ξ-hydroxy-1,4-diene steroids useful as intermediates to prepare the compounds of the principal composition aspect.

The present invention, in another of its embodiments contemplates a process comprising reduction with aluminum hydride of known, 1,4-dien-3-one steroids to prepare the new 3ξ-hydroxy-1,4-diene steroid intermediates.

DESCRIPTION OF THE INVENTION

The tangible embodiments of the principal composition aspect of the invention possess the inherent general physical properties of being crystalline solids. Examination of the compounds produced according to the hereinafter described process reveals upon nuclear magnetic resonance ultraviolet and infrared spectrographic analysis, spectral data confirming the molecular structure hereinbefore set forth. For example, the elimination of the oxygen atom from the 3-position is evident. The aforementioned physical characteristics, taken together with the nature of the starting materials, and the mode of synthesis confirm the molecular structure herein set forth.

The tangible embodiments of the compositions of the present invention possess the inherent applied use characteristic of exerting steroid hormone activity in animals, as evidenced by evaluation according to standard test procedures, a pattern of activities possessed by hormonal agents.

The instant invention, therefore, in its broadest aspects contemplates, in essence, 1,4-diene compounds of Formula I:

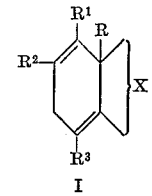

I wherein
R is alkyl of from about 1 to about 5 carbon atoms, particularly methyl;
$R^1$, $R^2$ and $R^3$ are hydrogen or alkyl of from about 1 to about 5 carbon atoms; and
X is an organic radical of at least 11 carbon atoms so arranged as to complete a cyclopentanoperhydrophenanthrene steroid nucleus.

Special mention is made of a class of preferred embodiments of this invention: These are steroidal 1,4-diene compounds of Formula I wherein R is methyl, $R^1$ and $R^3$ are hydrogen, $R^2$ is hydrogen or methyl and X is substituted with hydrogen, hydroxy, alkanoyloxy, keto, carbalkoxy, cyano, alkyl, alkenyl, alkynyl, haloalkynyl, methylene, ethylidene, lactone, ether, ketal, spiroketal, halogen or unsaturated linkages. The terms "alkyl," "alkenyl," "alkynyl," and "haloalkynyl" includes straight and branched chain hydrocarbon groups containing from about five carbon atoms and single, double or triple bonds, as the case may be. Illustrative groups are, for example, methyl, ethyl, n-propyl, n-butyl, t-butyl, n-pentyl, 2-ethylpropyl, and olefinic and acetylenic derivatives thereof. "Alkanoyloxy" and "carbalkoxy" groups include those containing from about 1 to about 18 carbon atoms in straight or branched chain arrangements, illustrative members of which are, for example, acetoxy, n-propionoxy, t-butyroxy, n-dodecanoyloxy, n-octadecanoyloxy, carbomethoxy, carboethoxy, carbo-n-propoxy, carbo-t-butoxy, carbo-n-dodecyloxy, carbo-n-octadecyloxy, and the like. "Halogen" includes fluorine, chlorine, bromine and iodine. "Ketals," "spiroketals" and "lactones" preferably contain, respectively, from about 2 to about 8 carbon atoms; from about 2 to about 8 carbon atoms and from about 2 to about 4 carbon atoms.

Among its embodiments the instant invention contemplates a class of compounds of Formula I hereinabove wherein the substituted organic radical X includes 11 carbon atoms arranged as follows:

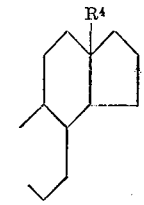

and $R^4$ is hydrogen or alkyl of from about 1 to about 5 carbon atoms. Included in this embodiment therefore are androsta-1,4-dienes (R and $R^4$ are methyl) and 10-methylgona-1,4-dienes (R is methyl, $R^4$ is hydrogen).

Particularly preferred species of this embodiment are those wherein X is a radical of the structure:

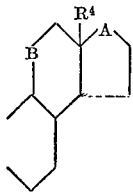

wherein

R⁴ is hydrogen or alkyl of from about 1 to about 5 carbon atoms, particularly methyl;

A is a divalent linkage selected from ketalized carbonyl,

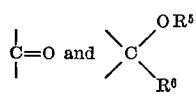

R⁵ being hydrogen or an acyl radical of an organic carboxylic acid having from 1 to 18 carbon atoms and R⁶ is hydrogen, lower alkyl, lower alkenyl, lower alkynyl or chloro lower alkynyl, especially methyl, ethyl, vinyl, ethynyl or chloroethynyl; and B is a divalent linkage selected from

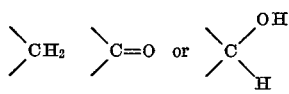

These compounds exhibit progestational, ovulation-inhibiting, anabolic, and androgenic activities.

Illustrative species of this embodiment are androsta-1,4-dienes such as:

androsta-1,4-diene-17-ol(17-hydroxyandrosta-1,4-diene);
androsta-1,4-dien-17-one, 17-ethylene ketal;
androsta-1,4-dien-17-one;
17α-ethynyl-17β-hydroxyandrosta-1,4-diene;
17α-chloroethynyl-17β-hydroxyandrosta-1,4-diene;
17α-methyl-17β-hydroxyandrosta-1,4-diene;

and the like. Special mention is made of 17α-ethynyl-17β-hydroxyandrosta-1,4-diene which is a valuable anabolic agent.

Also contemplated by the instant invention is a class of compounds of Formula I hereinabove wherein the substituted organic radical X includes 13 carbon atoms arranged as follows:

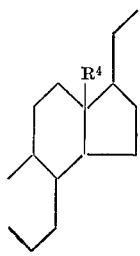

and R⁴ is hydrogen or alkyl of from about 1 to about 5 carbon atoms. Included in this embodiment therefore are pregnan-1,4-dienes (R and R⁴ are methyl) and 17-ethyl-10-methylgona-1,4-dienes (R is methyl, R⁴ is hydrogen).

Particularly preferred species of this embodiment are those of Formula Ia:

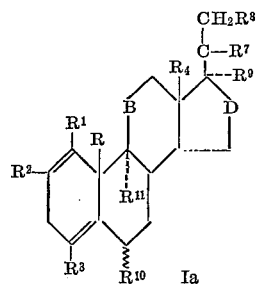

wherein

R is alkyl of from about 1 to about 5 carbon atoms;

R¹, R² and R³ are hydrogen or alkyl of from about 1 to about 5 carbon atoms;

R⁴ is hydrogen or alkyl of from about 1 to about 5 carbon atoms, particularly methyl;

B is a divalent linkage selected from

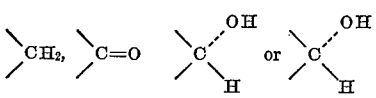

D is a divalent linkage selected from

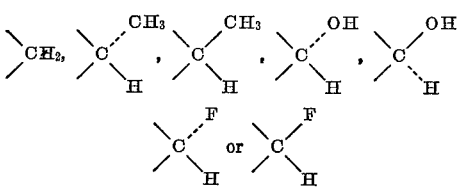

R⁷ is keto, H(OH) or H(OR¹²), R¹² being a hydrocarbon acyl group of up to 18 carbon atoms;

R⁸ and R⁹, independently, are hydrogen, hydroxyl or a hydrocarbon carboxylic acyloxy group of up to 18 carbon atoms;

R¹⁰ is hydrogen or alkyl of from about 1 to about 5 carbon atoms, especially methyl;

R¹¹ is hydrogen or fluorine; and 20-(lower alkylene), preferably ethylene, ketal derivatives of said compounds wherein R⁷ is keto, 17α,21-(lower)alkylenedioxy, preferably isopropylidenedioxy, derivatives of said compounds wherein R⁸ and R⁹ are hydroxy, and 17α,20;20,21-bis [lower(alkylene dioxy)], preferably methylenedioxy, derivatives of said compounds wherein R⁸ and R⁹ are hydroxy and R⁷ is keto. The compounds of this embodiment wherein R⁸ represents hydrogen are powerful progestational agents with oral activity. In addition they have anti-androgenic, anti-gonadotrophic, anti-inflammatory and anti-estrogenic properties and are very useful in fertility control. Furthermore, they may be used in the treatment of premenstrual tension and they exhibit blood cholesterol-lowering and diuretic activities. When applied topically, or administered orally the compounds are useful in the treatment of acne.

The compounds of this embodiment wherein R⁸ is not hydrogen and B represents a β-hydroxymethylene group are valuable cortical hormones with anti-inflammatory, low catabolic, glycogenic and thymolytic activities. In addition, they are anti-androgenic, anti-gonadotrophic and anti-estrogenic hormones. Furthermore, they have activity, including topical activity, in skin disorders such as psoriasis, allergic dermatitis and the like.

Illustrative of this embodiment are pregna-1,4-dienes, and more particularly,

17α,20;20,21-bis-(methylenedioxy)-11-hydroxypregna-1,4-diene;
11,17α,21-trihydroxypregna-1,4-dien-20-one;
21-hydroxypregna-1,4-dien-20-one, 20-ethylene ketal;
21-hydroxypregna-1,4-dien-20-one;

17α,21-dihydroxypregna-1,4-dien-20-one, 20-ethylene ketal;
17α,21-dihydroxypregna-1,4-dien-20-one;
20ξ-hydroxypregna-1,4-diene;
pregna-1,4-dien-20-one;
9α-fluoro-16α-methyl-17α,20;20,21-bis(methylenedioxy)-11β-hydroxypregna-1,4-diene;
9α-fluoro-16α-methyl-11β,17α,21-trihydroxypregna-1,4-dien-20-one;
9α-fluoro-11β,16α,17α,21-tetrahydroxypregna-1,4-dien-20-one;
6α-methyl-11β,17α,21-trihydroxypregna-1,4-dien-20-one;
2,6α-dimethyl-11β,17α, 21-trihydroxypregna-1,4-dien-20-one;
9α-fluoro-6α-methyl-11β,17α,21-trihydroxypregna-1,4-dien-20-one;
9α-fluoro-11β,17α,21-trihydroxypregna-1,4-dien-20-one;
9α-fluoro-11β-hydroxy-17α,20;20,21-bis(methylenedioxy)-pregna-1,4-diene, and the like. Special mention is made of two compounds, 17α,20;20,21-bis(methylenedioxy) - pregna-1,4-dien-11β-ol and 17α,20;20,21-bis(methylenedioxy) - 9α-fluoro-16α-methyl-pregna-1,4-dien-11β-ol, which are highly potent anti-inflammatory agents.

The present invention in a second composition aspect resides in the concept of a 3-hydroxy-1,4-diene steroid.

The tangible embodiments of the second composition aspect of the invention possess the inherent general physical properties of being crystalline solids. Examination of these compounds produced according to the hereinafter described process reveals upon nuclear magnetic resonance, ultraviolet and infrared spectrographic analysis, spectral data confirming the molecular structure hereinbefore set forth. For example the oxygenated methylene grouping at the 3-position is evident. The aforementioned physical characteristics, together with the nature of the starting materials and reactions of the compounds of the second composition aspect of the invention positively confirm their structure.

The tangible embodiments of the second compositions of this invention possess the inherent applied use characteristics of intermediates for the preparation of the valuable steroidal 1,4-dienes which are the principal composition aspect of the invention. Pregnane members of this series have valuable anti-inflammatory properties.

The second composition aspect of this invention includes, in essence, compounds of Formula II:

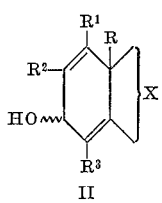

II wherein

R is alkyl of from about 1 to about 5 carbon atoms;
$R^1$, $R^2$ and $R^3$ are hydrogen or alkyl of from about 1 to about 5 carbon atoms; and
X is an organic radical selected from

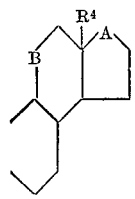

wherein $R^4$ is hydrogen or alkyl of from about 1 to about 5 carbon atoms;

A is a divalent linkage selected from protected carbonyl, especially ketalized carbonyl, and

$R^5$ being hydrogen and
$R^6$ being alkyl of from about 1 to about 5 carbon atoms, alkenyl of from about 1 to about 5 carbon atoms, alkynyl of from about 1 to about 5 carbon atoms or chloroalkynyl of from about 1 to about 5 carbon atoms; and B is a divalent linkage selected from protected carbonyl, especially ketalized carbonyl,

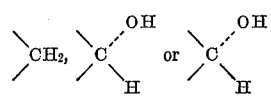

and

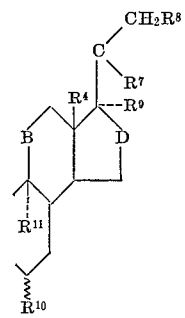

wherein $R^4$ and B are as hereinabove defined;
D is a divalent linkage selected from

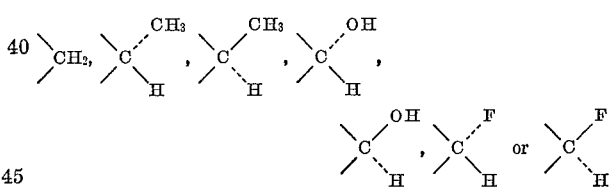

$R^7$ is protected carbonyl, especially ketalized carbonyl or H(OH);
$R^8$ and $R^9$ are hydrogen or hydroxyl;
$R^{10}$ is hydrogen or alkyl of from about 1 to about 5 carbon atoms; and
$R^{11}$ is hydrogen or fluorine.

Especially preferred embodiments of this aspect are 3ξ,17α,21-trihydroxypregna-1,4-dien-20-one in the form of a 20 cyclic ethylene ketal; 9α-fluoro-16α-methyl, 3ξ,11β,17α,21-tetrahydroxypregna-1,4-dien-20-one in the form of a 17α,20; 20,21-bis (methylenedioxy) derivative thereof; and 9α-fluoro-3ξ,11β-17α,21-tetrahydroxypregna-1,4-dien-20-one in the form of a 17α,20; 20,21-bis (methylenedioxy) derivative.

The present invention, in its broadest aspects, contemplates a process for the preparation of a 1,4-diene compound of Formula I hereinabove which comprises, if required, protecting sensitive groups in other portions of the molecule; selectively reducing the group Y in a 1,4-diene compound of the formula:

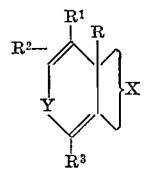

wherein

R is alkyl of from about 1 to about 5 carbon atoms;

R¹, R² and R³ are hydrogen or alkyl of from about 1 to about 5 carbon atoms;

X is an organic radical of at least about 11 carbon atoms so arranged as to complete a cyclopentanoperhydrophenanthrene steroid nucleus; and Y is

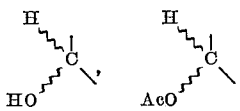

or

wherein Ac is acyl, arylsulfonyl, alkylsulfonyl, or an obvious chemical equivalent thereof; until conversion of Y to a methylene group is substantially complete and; if required, regenerating the protected sensitive groups; then, if required, oxidizing, reducing, alkylating, esterifying or hydrolyzing the compound thus formed. Of course, as will be well understood by those skilled in the art, the term "selectively reducing" means replacing the oxygenated 3-position group with one or two hydrogen atoms (depending on the nature of Y) without irreversibly degrading the rest of the steroid molecule. Many means are known to accomplish this, including protecting sensitive groups in other portions of the molecule and regenerating them by subsequent operations. For example, the 17-ketol group in corticosteroids is protected by forming a diethylene ketal or the like; a 17,12; 20,21-bismethylenedioxy group; or a 17,21-diacetal with subsequent reduction of the carbonyl function. After having protected the dihydroxyacetone side chain, the 3-oxygen function is reduced with LiAlH₄ or AlH₃ to a Δ-1,4-dien-3-ol, and then the allylic alcohol arrangement is cleaved according to the instant process and the pregna-1,4-diene is obtained. The protected 17-dihydroxyacetone group is regenerated by treatment with acid as will be fully described hereinafter. If a 17,21 acetal is used as a protecting group, the 20-alcohol is reoxidized, with chromic oxide in pyridine or an obvious chemical equivalent thereof, before removal of the acetal with acid. Furthermore, if the substituent in the 5-membered "D" ring constitutes only a 17- or a 20-ketone group, the ketone group can be protected by conversion to an ethylene ketal or it can be reduced prior to the cleavage and subsequently oxidized with CrO₃ or an obvious chemical equivalent thereof. An acyloxy group will undergo conversion during reduction to a hydroxy group, but it may, if required, be re-esterified. These procedures will be fully exemplified hereinafter.

As mentioned, also contemplated by the instant invention are embodiments comprising the novel selective reduction of a 3-hydroxy, a 3-acyloxy or a 3-keto group including subsequent, optional, steps of oxiding, reducing, alkylating, esterifying, and hydrolyzing functional groups in radial X. For example, it is contemplated to convert a hydroxymethylene group to a keto group by use of chromic acid or an Oppenauer reagent, such as aluminum isopropoxide. Where there is a carbonyl group in X which it is desired to convert to a hydroxymethylene group, this is done with a reducing agent, for example a borohydride to reduce a 17-keto, a 20-keto or a 11-keto group. Where it is desired to convert an alkylenedioxymethylene group or a bismethylenedioxy group, and the like to corresponding carbonyl-containing groups, the latter are obtained by hydrolysis under the acid conditions necessary to remove the ketal groups. Where it is desired to convert a hydroxymethylene or a hydroxy (alkyl-substituted)methylene group to corresponding acyloxymethylene groups, the latter are obtained by esterification with an acylating agent. Esterification can be carried out by any suitable acylating agent, for instance an acid anhydride, acyl halide, or the ester of an acylating acid with a lower alcohol. If it is desired to convert a keto group to an hydroxy ("alkyl"-substituted)methylene group ("alkyl" in this sense including saturated lower alkyl, lower alkenyl, lower alkynyl or chloro lower alkynyl), the compound with former group is treated with an "alkyl" magnesium halide or an "alkyl" lithium compound; in all cases the reagents are preferably brought together in a suitable solvent medium and heat is applied as necessary.

The present invention is one of its process aspects contemplates the preparation of a 1,4-diene compound of Formula I hereinabove, which comprises selectively reducing the 3-ol group in a 1,4-dien-3-ol compound of the formula:

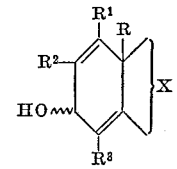

wherein

R is alkyl of from about 1 to about 5 carbon atoms;

R₁, R₂ and R₃ are hydrogen or alkyl of from about 1 to about 5 carbon atoms; and X is an organic radical of at least 11 carbon atoms so arranged as to complete a cyclopentanoperhydrophenanthrene steroid nucleus, with an alkali metal, preferably lithium, in a liquid amine, preferably ammonia, and preferably in the presence of an alkanol; or with lithium in a low molecular weight amine, preferably ethylamine.

One of the processes of this invention for making a specific embodiment of the principal composition aspect of this invention, which is the reduction of androsta-1,4-dien-3,17-diol to androsta-1,4-dien-17-ol, is illustrated schematically as follows:

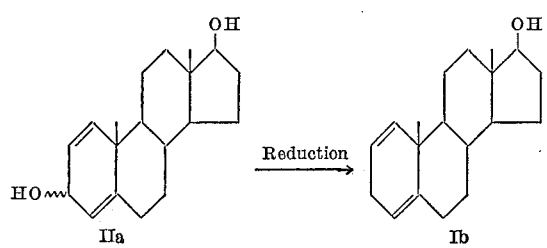

This first manner and process of making the principal compositions of the invention will now be generally described so as to enable a person skilled in the art of chemistry to make the same.

The steroidal 1,4-dien-3-ols employed as starting materials in the processes of this invention and for the preparation of the compositions of the invention are known in the art [J. Amer. Chem. Soc., 80, 3702 (1958)] or are readily prepared according to analogous procedures by those skilled in the art. One especially useful method, involving the use of aluminum hydride, is contemplated by this invention and will be described hereinafter.

When a steroidal 1,4-dien-3-ol (IIa) is mixed with an alkali metal in liquid ammonia, preferably in the presence of an alkanol; or with lithium in a low molecular weight amine, preferably ethylamine, the product obtained is the desired steroidal 1,4-diene (Ib). Separation and purification of this product is achieved by benzene extraction, chromatographic elution on alumina with a benzene-hexane mixture and recrystallization from acetone-hexane or other solvents and chromatographic media known to those skilled in the art.

Also contemplated by this invention is a two-step process for the preparation of a 1,4-diene compound of Formula I hereinabove which comprises (a) acylating the 3-ol group in a 1,4-diene-3-ol compound of Formula II

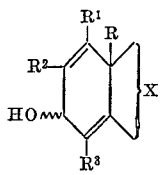

wherein
R is alkyl of from about 1 to about 5 carbon atoms;
$R^1$, $R^2$ and $R^3$ are hydrogen or alkyl of from about 1 to about 5 carbon atoms; and
X is an organic radical of at least 11 carbon atoms so arranged as to complete a cyclopentanoperhydrophenanthrene nucleus, to form a 3-acyloxy compound of Formula III

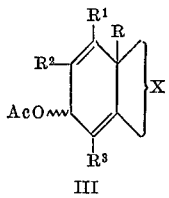

wherein R, $R^1$, $R^2$, $R^3$ and X are as above defined and Ac is an acyl group, preferably of from about 2 to about 12 carbon atoms, an arylsulfonyl group, an alkylsulfonyl group or an obvious chemical equivalent thereof and (b) reductively cleaving the 3-acyloxy group in said compound with an alkali metal, such as lithium in the presence of a solvent such as liquid ammonia or ethylamine.

A specific embodiment of this aspect of the invention is the process of making androsta-1,4-dien-17-ol from 3ξ,17β-diacetoxyandrosta-1,4-diene illustrated schematically as follows:

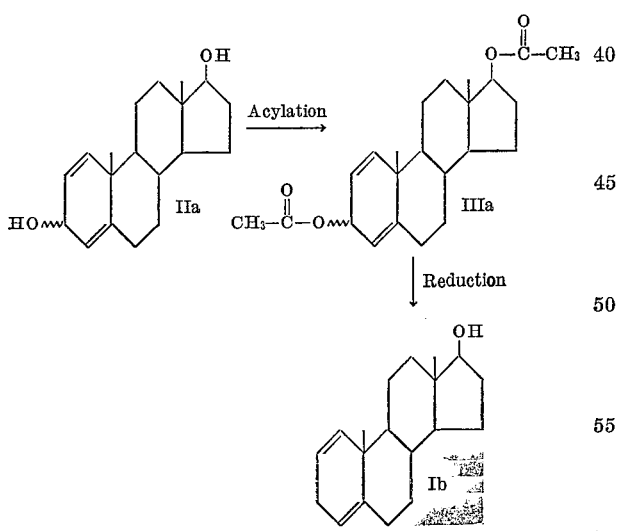

This second manner and process of making the compositions of the invention will now be generally described so as to enable a person skilled in the art of chemistry to make and use the same.

When a steroidal 1,4-dien-3-ol IIa is mixed with a carboxylic acid anhydride such as acetic anhydride and an excess of pyridine, solution of the steroid occurs. The reaction mixture is allowed to stand at room temperature for about sixteen hours, and then the resulting 3-acyl 1,4-diene steroid (IIIa) is separated by conventional recovery procedures. Reduction of the 3-acyloxy-1,4-diene steroid (IIIa) is brought about by the hereinbefore first described procedure of the present invention. In this manner, the desired steroidal 1,4-diene (Ib) is obtained.

While the preferred acylating agent is acetic anhydride, it will be apparent to those skilled in the art that other acylating agents such as, for example, acetyl chloride, propionic acid anhydride, an arylsulfonic acid chloride or an alkylsulfonic acid chloride, can be used in lieu thereof.

Among the valuable embodiments of the invention, affording higher yields of purer product than heretofore, is a process for the preparation of a 1,4-diene-3ξ-ol compound of Formula II which comprises selectively reducing a 1,4-diene-3-one of Formula IV:

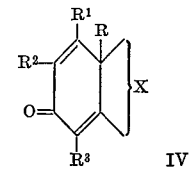

wherein
R is alkyl of from about 1 to about 5 carbon atoms;
$R^1$, $R^2$ and $R^3$ are hydrogen or alkyl of from about 1 to about 5 carbon atoms; and
X is an organic radical of at least 11 carbon atoms so arranged as to complete a cyclopentanoperhydrophenanthrene ring, with aluminum hydride at a temperature of below about 10° C. until replacement of the 3-keto group by a 3-hydroxyl group is substantially complete, and recovering said compound.

The starting materials of Formula IV are readily available or can be prepared by techniques within the capabilities of those skilled in the art. For example, a number of particularly useful starting materials are described by W. S. Allen, H. M. Kissman, S. Maner, I. Ringler and M. J. Weiss, in J. Med. Pharm. Chem., 5, 133 (1962) and by Beyler and Sarett in U.S. 2,888,457. The term "selectively reducing" is used in the sense illustrated hereinabove. A temperature of below about 10° C. is employed because at higher temperatures there is observed a tendency for the aluminum hydride to cause hydrogenolysis of the 3-hydroxy group and to give 1,4-dienes admixed with 2,4- and 1,3-dienes. To carry out this process, the steroid of Formula IV is suspended in about 50 to 100 parts by weight of an inert solvent, such as tetrahydrofuran, and the mixture is chilled to the desired reaction temperature—about −10° C. is especially useful. A chilled, filtered solution of aluminum hydride (prepared by treating lithium aluminum hydride with aluminum chloride) in a solvent such as ether is added slowly. The reaction mixture is stirred in the cold until reaction is substantially complete; in most instances, one hour is sufficient. The product is recovered by conventional techniques. One especially convenient way is to add about an equal volume of ethyl acetate slowly while keeping the mixture cold. Then the cold bath is removed and about an equal volume of saturated sodium sulfate solution and water are added. The hydrated alumina is removed by filtration and the filtrate is extracted with a water immiscible solvent, such as chloroform. Evaporation of the extract leaves the product of Formula II as a residue.

In addition to the process herein for obtaining compounds of Formula I by selective reduction of compounds of Formula II, the instant invention contemplates also a process to prepare compounds of Formula I which comprises
(a) Selectively reducing the 3-one group in a 1,4-diene-3-one of Formula IV:

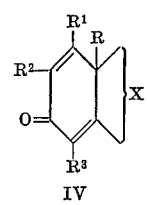

wherein

R is alkyl of from about 1 to about 5 carbon atoms;

$R^1$, $R^2$ and $R^3$ are hydrogen or alkyl of from about 1 to about 5 carbon atoms; and X is an organic radical of at least 11 carbon atoms so arranged as to complete a cyclopentanoperhydrophenanthrene ring, with aluminum hydride at a temperature of from about 10° C. to about 30° C. until formation of a mixture the corresponding 1,4-diene, 2,4-diene and 1,3-diene compounds is substantially complete;

(b) Treating said 1,4-diene compound admixed with said 2,4-and 1,3-diene byproducts with lithium in liquid ammonia whereby said byproducts are reduced to monoenes; and (c) Crystallizing the mixture to recover the said 1,4-diene substantially free of the reduced byproducts. The term "selectively reducing" is used in the sense illustrated hereinabove. A temperature of above about 10° C. is employed because at lower temperatures there is a tendency for the reaction to stop at the 3-ol stage and not provide a significant yield of the desired product of Formula I. In this process the steroid of Formula IV is suspended in about 15 parts by weight of an inert solvent such as tetrahydrofuran, and a solution of lithium hydride (prepared from lithium aluminum hydride and aluminum chloride) in ether is added. This can be done at temperatures below 10° C., even at, for example, −10° C. The reaction mixture is next warmed to above 10° C., preferably about 25° C., and maintained until formation of the 1,4-diene of Formula I is substantially complete. The product, which contains 2,4- and 1,3-diene byproducts is recovered by decomposing the reaction mixture with ice, followed by extraction with chloroform then evaporation of the chloroform. The residue is dissolved in a mixture comprising about 40 parts by weight of tetrahydrofuran, 250 parts by liquid ammonia and about 0.2 to 1.0 parts of an alkanol, such as 1-methoxy-2-propanol. Lithium metal is added in small portions until a blue color remains for about 5 minutes. The blue color is discharged with ammonium chloride and hot water, then the mixture is extracted with a solvent, such as chloroform. Evaporation of the chloroform leaves a residue from which the product of Formula I is obtained by recrystallization from ether or ether- petroleum ether. It is substantially free from byproducts.

It will be apparent from the disclosure herein to those skilled in the art that for the purposes of this invention, certain of the atoms of the steroidal 1,4-dien-3-ol starting materials can be substituted with groups which do not interfere with the subsequent reactions. Thus included within the scope of this invention are androsta-1,4-dienes, pregna-1,4-dienes, 10-alkylgona-1,4-dienes and cholesta-1,4-diene derivatives.

When the starting compounds are substituted as hereinbefore designated, it will be apparent herefrom to those skilled in the art of chemistry that the final product formed in the processes of the invention will bear correspondingly the same or related substituents. Thus, for the processes of the invention and for the product of the invention produced thereby, such groups are the full equivalents of the invention as particularly claimed.

When the steroidal 1,4-dienes of this invention are employed as hormonal agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 400 mg. per day, although as aforementioned variations will occur. However, a dosage level that is in the range of from about 0.5 mg. to about 100 mg. per day is most desirably employed in order to achieve effective results.

DESCRIPTION OF THE PREFERRED EMBODIMENTS

The following examples illustrate the best mode contemplated of using the claimed processes of the invention and of the manner of making the claimed compositions of the invention.

EXAMPLE 1

17β-hydroxyandrosta-1,4-diene

3ξ,17β - dihydroxyandrosta - 1,4 - diene [M. J. Gentles, J. B. Moses, H. L. Herzog and E. B. Hershberg, J. Am. Chem. Soc., 80, 3702 (1958), 2.155 g.] is reduced with lithium (0.553 g.) in liquid ammonia (900 ml.) containing tetrahydrofuran (95 ml.) and 1-methoxypropan-2-ol (2.08 ml.). The product (1.095 g.) is obtained by addition of ammonium chloride and water, extraction with chloroform and is chromatographed on neutral alumina (30 g.). Elution with benzene-hexane mixtures and pure benzene gives crystalline fractions which, after recrystallization from acetone-hexane, yield 17β-hydroxyandrosta-1,4-diene (0.516 g.), M.P. 130–132.5° C., $[\alpha]_D^{22.5}+33.6°$ C. no selective ultra-violet absorption beyond 220 mμ, infra-red absorption maximum 3280 cm.$^{-1}$, proton nuclear magnetic resonance signals (obtained in deuterochloroform and measured downfield from tetramethylsilane as internal standard) 0.76 ($C_{18}$-proton), 1.09 ($C_{19}$-protons), 2.60 (multiplet, allylic protons), 3.63 (triplet, J–10.7 c.p.s., 17α-proton), 5.33 (multiplet, vinylic proton) and 5.69 (multiplet, vinylic protons). [Found: C, 83.6; H, 10.1 $C_{19}H_{28}O$ requires: C, 83.8; H, 10.4%.] Palladium catalyzed uptake by 17β-hydroxyandrosta-1,4-diene of one molecular proportion of hydrogen gives a mixture from which is isolated 17β-hydroxyandrost-4-ene, M.P. 154–156.5° C. identical by mixed M.P., infra-red absorption, thin layer chromatographic behaviour to an authentic sample (ref. Huang-Minlon, JACS, 71, 3301 [1949]).

EXAMPLE 2

17β-hydroxyandrosta-1,4-diene (alternative procedure)

(a) acylation step.—3ξ,17β - dihydroxyandrosta-1,4-diene (5.1 g.) is kept overnight at room temperature in pyridine (25 ml.)-acetic anhydride (5 ml.). Thereafter, methanol is added and the solvents removed under reduced pressure. The residue is then evaporated successively with toluene and methanol to give a product which is chromatographed on neutral alumina. Elution with benzene gives 3ξ,17β-diacetoxyandrosta-1,4-diene (1.708 g.) having no selective ultra-violet absorption beyond 220 mμ, infra-red absorption maxima at 2800 cm.$^{-1}$.

(b) Reduction step.—3ξ,17β - diacetoxyandrosta-1,4-diene (1.708 g.) is reduced with lithium (0.4 g.) in ethylamine (125 ml.), ammonium chloride (4 g.) is added followed by water, and the precipitate is filtered off, washed with water and dried to give 17β-hydroxyandrosta-1,4-diene.

EXAMPLE 3

Androsta-1,4-dien-17-one, 17-ethylene ketal

3ξ-Hydroxyandrosta-1,4-dien-17-one, 17-ethylene ketal (1.7 g.) in tetrahydrofuran (78 ml.) is added to 420 ml. of liquid ammonia (distilled from Li metal) and 1.7 ml. of 1-methoxy-2-propanol. Lithium metal is added in small portions, while stirring vigorously, until the blue color persists for exactly 5 minutes. Solid ammonium chloride is added to discharge the color and most of the ammonia is removed by cautious addition of water. The product is then extracted into $CHCl_3$. The $CHCl_3$ solution is washed once with water and dried over $Na_2SO_4$. Removal of the solvent under high vacuum yields the product as on oil, 1.6 g. The infrared spectrum conforms to the expected structure.

EXAMPLE 4

Androsta-1,4-dien-17-one

Androsta-1,4-dien-17-one, 17-ethylene ketal (1.5 g.) is dissolved in 25 ml. of methanol and stirred for 3 hours at room temperature with 2.5 ml. of a mixture of conc. HCl (37.5 ml.) and water (12.5 ml.). A slight excess of saturated $NaHCO_3$ solution and water is then added and the product extracted into $CHCl_3$. The chloroform solution is washed with water, dried over $Na_2SO_4$ and solvent removed in vacuo to give the product, 1.0 g. (oily solid).

$\lambda_{max}^{CHCl_3}$ 3.44, 3.48, 3.52, 5.75 mμ

UV; negligible absorption at 243 mμ.

EXAMPLE 5

Androsta-1,4-dien-17-one (alternative procedure)

To 840 mg. of 17β-hydroxyandrosta-1,4-diene dissolved in acetone (30 ml.) and stirred at 0–5° C. under $N_2$, 0.93 ml. of a solution of $CrO_3$ in $H_2O$ and $H_2SO_4$ (2.75 g. of CrO in 8.0 ml. of $H_2O$ and 2.3 ml. of conc. $H_2SO_4$) are added dropwise. After stirring for 1 minute at 0–5° the cold bath is removed and the mixture is allowed to warm while continuing to stir under $N_2$ for 6 additional minutes. Excess water is then added and organic material is extracted with ethyl acetate. The ethyl acetate solution is washed with water and saturated salt solution, dried over $Na_2SO_4$ and the solvent removed under high vacuum to give the product as an oil (623 mg.). Crystals from methanol (524 mg.), M.P. 60–72°.

$\lambda_{max}^{KBr}$ 3.44, 3.48, 3.52, 5.75μ

EXAMPLE 6

17α-ethynyl-17β-hydroxyandrosta-1,4-diene

Dry acetylene is bubbled into a solution of 1.2 g. of androsta-1,4-dien-17-one in 15 ml. of dimethylacetamide for one hour at room temperature. Lithium acetylide-ethylenediamine complex (0.81 g.) is then added and the stirring and acetylene addition continued for three hours. The reaction mixture is poured over ice (50 g.) and extracted with benzene. The benzene extracts are washed with water, dried over sodium sulfate, and vacuum evaporated to an oil. The oil is subjected to column chromatography and the product is obtained after recrystallization from hexane; M.P. 85–96°.

$C_{21}H_{28}O + \frac{1}{2}H_2O$ (305.44). Calcd. (percent): C, 82.57; H, 9.57. Found (percent): C, 82.90; H, 9.36.

NMR and IR spectra are consistent with the proposed structure.

EXAMPLE 7

17α-chloroethynyl-17β-hydroxyandrosta-1,4-diene

In a 100 ml. round bottom flask equipped with a magnetic stirrer, gas inlet, calcium chloride outlet tube, thermometer, and dropping funnel is placed 8.8 ml. of distilled tetrahydrofuran. The flask is flushed with nitrogen. A solution of methyllithium in ethyl ether (23.9 ml., 0.04 mole) is added with a hypodermic needle and syringe. The contents of the flask are then cooled to —5° C. with ice-methyl alcohol bath. To this chilled and stirred solution is added 1.84 ml. of trans-1,2-dichloroethylene (0.024 mole) in 10 ml. of distilled tetrahydrofuran over a period of 15 minutes, maintaining the temperature between 0 and 5° C. The reaction mixture is then warmed to 25° C. To the stirred reaction mixture is rapidly added, as a solid, 3.38 g. of androst-1,4-dien-17-one (0.0125 mole). The mixture is stirred for 2 hours, under nitrogen, then poured into 25 ml. of water. The material is extracted with ether, the extract is washed with water, dried with sodium sulfate, and the product is obtained by vacuum evaporation.

EXAMPLE 8

17α,20;20,21-bis(methylenedioxy) - 11β - hydroxypregna-1,4-diene-(a) 17α,20;20,21 - bis(methylenedioxy)-3ξ, 11β-dihydroxy pregna-1,4-diene (a) To a stirred solution of 17α,20;20,21-bis(methylenedioxy)-11β-hydroxypregna-1,4-dien-3-one (20.6 g.) in 1.1 liter of tetrahydrofuran at —10° C., lithium aluminum hydride (20.6 g.) is added in small portions and the mixture stirred at —10° C. for 45 minutes. The reaction is terminated by adding 900 ml. of acetone at such a rate as to keep the temperature from exceeding 20° C. Water (1350 ml.) is added and the mixture filtered with a filter aid. Vacuum evaporation yields 17.71 g. of the intermediate.

(b) 17α,20;20,21-bismethylenedioxy - 11β - hydroxypregna-1,4-diene.—To 4.5 l. of ammonia in a flask fitted with a Dry Ice/acetone condenser is added 17.7 g. of 17α,20;20,21-bis(methylenedioxy) - 3,11β - dihydroxypregna-1,4-diene dissolved in 1.13 l. of tetrahydrofuran containing 11.0 ml. of 1-methoxy-2-propanol. There is then added piece by piece 857 mg. of lithium (blue color persists for five minutes). Solid ammonium chloride is added, then 1 l. of water. The reaction mixture is allowed to stand open in the hood overnight. Water (800 ml.) is added and the mixture is extracted with chloroform. The chloroform extract is dried with anhydrous sodium sulfate, then vacuum evaporated to a small volume. Ethyl acetate is added and the mixture is vacuum evaporated to an oil. Methanol is added and the solution is seeded. The crude product (7.15 g.) dissolved in benzene is placed on a column of 210 g. of alumina in benzene. Elution with benzene yields crystalline fractions, which after recrystallization from methanol afford the product (4.524 g.). M.P. 186–188° C. $[\alpha]_D^{24}$ —49° (1% $CHCl_3$), no selective ultra-violet absorption beyond 220 mμ, $\lambda_{max}^{KBr}$ 2.86, 3.50μ, etc.

Calcd. for $C_{23}H_{32}O_5$ (percent): C, 71.10; H, 8.30. Found (percent): C, 70.89; H, 7.99.

EXAMPLE 9

11β,17α,21-trihydroxypregna-1,4-dien-20-one

17α,20;20,21-bismethylenedioxy - 11β - hydroxypregna-1,4-diene (250 mg.) is dissolved in 30 ml. of dioxane and added to a boiling solution of 70% formic acid (250 ml.). Boiling is continued for 2 minutes and the mixture is poured into ice water (450 ml.). Extraction with $CHCl_3$ followed by washing with $NaHCO_3$ solution and water and then concentrating in vacuo yields an oil (250 mg.). The residue is crystallized from benzene to provide 70 mg. of the product as a benzene solvate, M.P. 108–116°.

EXAMPLE 10

21-hydroxypregna-1,4-diene-20-one, 20-(ethylene ketal)

To a stirred suspension of 6.16 g. of LiAlH$_4$ in 540 ml. of ether at 0° C. is added 6.48 g. of AlCl$_3$. After one hour the mixture is filtered and the filtrate comprising aluminum hydride is added over 10–15 minutes to a stirred solution of 12.0 g. of 21-hydroxypregna-1,4-diene-3,20-dione, 20-(ethylene ketal) in 360 ml. of tetrahydrofuran at —10° C. The reaction mixture is then poured over ice and extracted with ethyl acetate. The ethyl acetate extract is washed with water, dried over sodium sulfate and vacuum evaporated to give 7.26 g. of the allylic alcohol, 3ξ,21-dihydroxypregna - 1,4 - dien-20-one, 20-ethylene ketal. The allylic alcohol is dissolved in 410 ml. of tetrahydrofuran containing 4.13 ml. of 1-methoxy-2-propanol and added with stirring to 1.815 l. of liquid ammonia. Lithium (374 mg.) is added piece-wise until the blue color persists for five minutes. The blue color is discharged by the addition of solid ammonium chloride, water is added and then the mixture extracted with ethyl acetate. The extract is washed with water and dried over sodium sulfate. Vacuum evaporation followed by recrystallization from methanol yields 3.47 g. of the product. The analytical sample is recrystallized from methanol/water; M.P. 115–117° C.: $\lambda_{max}$ no selective absorption;

$\lambda_{max}^{KBr}$ 3.0, 3.46μ etc.

Calculated for CH$_{23}$H$_{34}$O$_3$ (percent): C, 77.05; H, 9.56. Found (percent): C, 77.19; H, 9.34.

EXAMPLE 11

21-hydroxypregna-1,4-dien-20-one

A solution of 2.0 g. of 21-hydroxypregna-1,4-diene-20-one, 20-(ethylene ketal) in 450 ml. of methanol and 45 ml. of 8% aqueous sulfuric acid is refluxed for 30 minutes under a blanket of nitrogen. The mixture is cooled to room temperature, neutralized with aqueous NaHCO$_3$-solution and then extracted with chloroform. The residue of the chloroform extract is crystallized from methanol and water to yield crystals, M.P. 113–119° C.; $[\alpha]_D = +119$.

$\lambda_{max}^{KBr}$ 2.93, 3.50, 5.88μ

Calcd. for C$_{21}$H$_{30}$O$_2$ (percent): C, 80.21; H, 9.62. Found (percent): C, 80.22; H, 9.46.

No selective absorption in the UV spectrum beyond 220 mμ.

EXAMPLE 12

17α,21-dihydroxypregna-1,4-dien-20-one-20-(ethylene ketal)

Two grams of 17α,21-dihydroxy-1,4-pregnadiene-3,20-dione 20-(ethylene ketal) are dissolved in 30 ml. of tetrahydrofuran and a solution of aluminum hydride (prepared from 2.28 g. of LiAlH$_4$ and 2.66 g. of AlCl$_3$) in 50 ml. of ether is added at —10° C. The reaction mixture is warmed to about 25° C., kept for 1 hour, and decomposed with ice. Extraction with chloroform and crystallization from ethyl acetate yields 1.0 g. of 17α,21-dihydroxypregna - 1,4 - diene-20-one, 20-(ethylene ketal) admixed with impurities comprising conjugated 1,3 and 2,4-dienes. The mixture is dissolved in 40 ml. of tetrahydrofuran, 250 ml. of ammonia and 0.3 ml. of 1-methoxypropan-2-ol. 34 mg. of lithium metal is added in portions until a blue color remains for 5 minutes. The blue color is discharged with 1.0 g. of NH$_4$Cl followed by hot water. The mixture is extracted with chloroform and the product crystallized from ether-petroleum ether to give the title product, M.P. 128–160°, free from conjugated diene byproducts.

EXAMPLE 13

17α,21-dihydroxypregna-1,4-dien-20-one

Eight hundred milligrams of 17α,21-dihydroxypregna-1,4-dien-20-one, 20-(ethylene ketal) are dissolved in 45 ml. of methanol and 15 ml. of 8% sulfuric acid and the mixture is refluxed on a steam bath for 30 minutes. The mixture is diluted with water and extracted with chloroform. The combined extracts are washed with NaHCO$_3$ solution and water. After concentrating in vacuo the residue is crystallized from methanol and water to yield 500 mg. of crystals. The analytical sample melts at 112–120° C.

Calcd. for C$_{21}$H$_{30}$O$_3$ (percent): C, 76.32; H, 9.15. Found (percent): C, 76.17; H, 9.48.

NMR signals at 0.66, s. (3H); 1.08, s. (3H); 2.61, m. (2H), 4.43, q. (2H); 5.20–5.70, m. (3H) p.p.m. The IR spectrum shows peaks at 3.00, 3.48 and 5.85μ. There is no selective absorption above 220 mμ in the UV spectrum. Thin layer chromatogram shows 1 spot in benzene and ethyl acetate (8:2).

EXAMPLE 14

20ξ-hydroxypregna-1,4-diene

20ξ-hydroxypregna-1,4-dien-3-one.—To a stirred solution of 12.0 g. of pregna-1,4-diene-3,20-dione in 345 ml. of methanol at 0° C. is added 1.46 g. of sodium borohydride. After stirring for 45 minutes, there is added 295 ml. of water containing 3.6 ml. of acetic acid. Stirring is continued for 90 minutes at room temperature after which the product is obtained by filtration, yield 11.6 g.

3ξ,20ξ-dihydroxypregna-1,4-diene.—There is added portionwise to a stirred solution of 10.58 g. of 20ξ-hydroxypregna-1,4-dien-3-one in 710 ml. of tetrahydrofuran 10.58 g. of lithium aluminum hydride at 0°±5° C. The stirring is continued for 45 minutes, then acetone is added at such a rate that the temperature does not exceed 5° C. Water is added and the mixture is extracted with ethyl acetate. The extracts are washed with water, dried over sodium sulfate, and vacuum evaporated to an oil.

20ξ-hydroxypregna-1,4-diene.—There is added to 2.37 l. of distilled ammonia in a flask fitted with a stirrer and a Dry Ice/acetone condenser the 3ξ,20ξ-dihydroxypregna-1,4-diene obtained from the previous step dissolved in 630 ml. of tetrahydrofuran containing 6.9 ml. of 1-methoxy-2-propanol. There then is added piece by piece 929 mg. of lithium (until the blue color persists for 5 minutes). The Dry Ice/acetone condenser is removed and solid ammonium chloride, then water are added, then the reaction mixture is heated with warm water to remove the ammonia, and the reaction mixture is extracted with chloroform. The chloroform extracts are washed with water, dried over sodium sulfate, and vacuum evaporated. The crude material is placed on a column of 300 g. of neutral alumina in benzene. Elution with 1% ethyl acetate in benzene yields 1.4 g. of the title product after recrystallization from acetone, M.P. about 138–141° C., $[\alpha]_D^{25}$ +8.7° (1% CHCl$_3$), no selective ultra-violet absorption beyond 220μ, $\lambda_{max}^{KBr}$ 3.0, 3.5μ, etc.

Calcd. for C$_{21}$H$_{32}$O (percent): C, 83.94; H, 10.73. Found (percent): C, 84.05; H, 10.70.

EXAMPLE 15

Pregna-1,4-diene-20-one

There is added dropwise to a stirred solution (under nitrogen) of 1.3 g. of 20ξ-hydroxypregna-1,4-diene in 48.5 ml. of acetone, 1.35 ml. of chromic oxide reagent. The stirring is continued for 5 minutes then water is added and the product extracted with ethyl acetate. Two recrystallizations from acetone, produce 557 mg. of the product, M.P. 131–137° C., $\lambda_{max}^{KBr}$ 3.50, 5.85μ, etc.

Calc'd for C$_{21}$H$_{30}$O (percent): C. 84.51; H, 10.13. Found (percent): C, 84.38; H, 9.91.

EXAMPLE 16

9α-fluoro-16α-methyl-11β,17α,21-tri-hydroxypregna-1,4-diene-20-one (a) 17α,20;20,21 - bis(methylenedioxy)9α - fluoro-16α-methyl-3ξ,11β-dihydroxypregna-1,4-diene.—17α,20;20,21-bis(methylenedioxy) - 9α-fluoro-16α-methyl-11β-hydroxypregna-1,4-dien-3-one is dissolved in 50 ml. of tetrahydrofuran and the solution is cooled to −10° C. Aluminum hydride (prepared from 276 mg. of LiAlH$_4$ and 300 mg. of AlCl$_3$) in 25 ml. of ether is added over a period of 15 minutes, and stirring is continued for another hour at −10° C. While the reaction mixture is kept cold 30 ml. of ethyl acetate is added over a period of 10 minutes and stirring continued for another hour. Crushed ice is added and the mixture extracted with chloroform. The combined chloroform extracts are washed with NaHCO$_3$ and then taken to dryness. After recrystallization from ether-hexane 300 mg. of the product is obtained, M.P. 122–140°; after recrystallization from chloroform-ether-petroleum, the compound melts at 180–181°. The thin layer chromatogram shows two spots (3α and 3β-ol), no selective absorption in the UV spectrum.

Calc'd for C$_{24}$H$_{33}$O$_6$F (percent): C, 66.01; H, 7.61; F, 4.35; Found (percent): C, 66.46; H, 7.72; F, 4.11.

The following signals are observed in the NMR spectrum; 0.92, doublet, 2H, J=6.5 c.p.s. (C$_{16}$), 1.13, singlet, 3H(C$_{18}$); 1.41 and 1.43, 2 singlets, 3H, (C$_{19}$ from 3α and 3β-ol); 3.99; singlet, 2H(C$_{21}$), 4.00–4.50, multiplets, 2H(C$_3$ and C$_{11}$); 4.90–5.30, multiplets (probably 2 AB quartets), 4H(methylene of BMD) 5.30–6.10, multiplets, 3H(C$_1$, C$_2$, C$_4$)

(b) 9α - fluoro-16α-methyl-17α,20;20,21-bis(methylenedioxy)-11β hydroxypregna-1,4-diene.—Three hundred milligrams of 17α,20;20,21 - bis(methylenedioxy)-9α-fluoro-16α-methyl 3ξ,11β-dihydroxypregna-1,4-diene are dissolved in 30 ml. of tetrahydrofuran, 150 ml. of liquid ammonia and 0.1 ml. of 1-methoxypropan-2-ol then 20 mg. of lithium is added over a period of 10 minutes. Then is added 6 drops of water (clear, colorless solution) and then another 30 mg. of lithium, the blue color is allowed to remain for 15 minutes. The mixture then is decolorized with hot water (200 ml.) extracted with chloroform and crystallized from hexane-ether to yield 100 mg. of crystals. Recrystallization from hexane ether affords the product, M.P. 178–188° C.

Calc'd for C$_{24}$H$_{33}$O$_5$F (percent): C, 68.55; H, 7.90; F, 4.51. Found (percent): C, 68.55; H, 7.81.

NMR signals at 0.95, d., 3H; 1.17 s., 3H; 1.43, S, 3H; 2.62 m., 2H; 3.98, s., 2H; 4.27, m. 1H; 4.90–5.20, m., 4H; (probably 2 AB quartets), 5.2–5.9, m., 3H p.p.m. No selective absorption in the UV spectrum. IR spectrum; 2.92, 3.44, 3.52 etc.

(c) 9α - fluoro - 16α - methyl-11β,17α,21-trihydroxypregna-1,4-dien-20-one.—The compound of step (b) is hydrolyzed with formic acid according to the procedure of Example 9 and the named product is obtained.

EXAMPLE 17

9α-fluoro-11β-hydroxy-17α,20;20,21-bis-(methylenedioxy)-pregna-1,4-diene

9α - fluoro - 3ξ,11β-dihydroxy-17α,20;20,21-bismethylenedioxypregna - 1,4-diene.—9α-fluoro-11β-hydroxy-17α,20;20,21-bismethylenedioxypregna-1,4-dien-3-one (Beyler and Sarett, U.S. 2,888,457, (445 mg.)) is slurried in tetrahydrofuran (30 ml.) and chilled to −10° C. A chilled, filtered solution of aluminum hydride in ether (prepared from 0.32 g. LiAlH$_4$ and 0.27 g. AlCl$_3$ in 22 ml. ether) is added slowly to the chilled slurry. Following complete addition the reaction is stirred for 1 hour at −10° C. Ethyl acetate (25 ml.) is then added dropwise, keeping the mixture cold. The cold bath is removed and saturated Na$_2$SO$_4$ solution (5 ml.) and water are added. The hydrated alumina is removed by filtration and the filter cake is washed thoroughly with CHCl$_3$. The layers in the combined filtrate are separated and the aqueous phase extracted several times with fresh portions of CHCl$_3$. The combined organic phase is washed with saturated NaCl solution and dried over Na$_2$O$_4$. Removal of solvent yields a grayish powder which is thoroughly extracted with hot isopropyl ether. Removal of solvent in vacuo followed by trituration of the resulting glass with hexane yields the crystalline product, 165 mg., M.P. 179–183° C.

C$_{23}$H$_{31}$FO$_6$ (422.48).—Requires (percent): C, 65.38; H, 7.40; Found (percent): C, 65.65; H, 7.13.

$\lambda_{max}^{KBr}$ 2.90–2.94, 3.43, 3.50, 5.92–6.2 (w.)μ

9α - fluoro - 11β - hydroxy-17α,20;20,21-bismethylenedioxypregna - 1,4-diene.—9α - fluoro - 3ξ,11β - dihydroxy-17α,20;20,21-bismethylenedioxopregna-1,4-diene (1.1 g.) dissolved in tetrahydrofuran (82.5 ml.) and 1-methoxy-2-propanol (0.4 ml.) is added to dry liquid ammonia (550 ml.). Li metal (40 mg.) is added portionwise and the slightly turbid blue solution is stirred for 5 min. Water (33 drops) is added until the solution just turns clear and colorless. Additional lithium metal (25 mg.) is added and the clear blue solution is stirred an additional 15 minutes. The color is discharged by the cautious addition of water and excess ammonia driven off by the addition of hot water (about 1 liter). Extraction with CHCl$_3$ followed by drying the organic phase over Na$_2$SO$_4$ and removal of solvent in vacuo yields a glassy solid which, after two crystallizations from ether-hexane, affords the product, 600 mg. M.P. 168–174° C.

$\lambda_{max}^{KBr}$ 2.88, 3.42, 3.49μ

NMR 3 proton singlet γ 1.08 (C–18); 3 proton singlet γ 1.45 (C–19); 2 proton multiplet, γ 2.62 (C–3); 2 proton singlet, γ 4.01 (C–21); 1 proton multiplet 4.31 (C–11); 4 proton multiplets, γ 5.05–5.23 (bismethylenedioxy methylene); 3 proton multiplet, γ 5.30–5.90 (C–1, C–2, C–4) p.p.m.

EXAMPLE 18

9α-fluoro-11β,16α,17α,21-tetrahydroxypregna-1,4-dien-20-one (a) 9α - fluoro - 3ξ,11β,16α,17α,21-pentahydroxypregna-1,4-dien-20-one,20-ethylene ketal.—9α - fluoro - 11β,16α,17α,21 - tetrahydroxypregna-1,4-dien-3,20-dione,20-ethylene ketal [Allen, Kissman, Maner, Ringler and Weiss, J. Med. Pharm. Chem., 5, 133 (1962)] is treated with aluminum hydride in the cold according to the procedure of Example 10 and the named intermediate is obtained.

(b) 9α - fluoro - 11β,16α,17α,21 - tetrahydroxypregna-1,4-diene-20-one,20-ethylene ketal.—The intermediate of step (a) is treated with lithium in liquid ammonia according to the procedure of Example 10 and the named product is obtained.

(c) 9α - fluoro - 11β,16α,17α,21 - tetrahydroxypregna-1,4-dien-20-one.—The ketal of step (b) is heated with sulfuric acid according to the procedure of Example 11 and the named product is obtained.

EXAMPLE 19

6α-methyl-11β,17α,21-trihydroxypregna-1,4-dien-20-one (a) 6α - methyl-3ξ,11β,17α,21-tetrahydroxypregna-1,4-dien - 20-one 20-ethylene ketal.—21-acetoxy-6α-methyl-11β,17α-dihydroxypregna-1,4-dien-3,20-dione 20-ethylene ketal [Allen, Kissman, Maner, Ringler and Weiss, J. Med. Pharm. Chem., 5, 133 (1962)] is treated with aluminum hydride in the cold according to the procedure of Example 10 and the named intermediate is obtained.

(b) 6α - methyl - 11β,17α,21 - trihydroxypregna - 1,4-dien-20-one, 20 ethylene ketal.—The intermediate of step (a) is treated with lithium in liquid ammonia according to the procedure of Example 10 and the named product is obtained.

(c) 6α - methyl - 11β,17α,21 - trihydroxypregna - 1,4-dien-20-one.—The ketal of step (b) is heated with sulfuric acid according to the procedure of Example 11 and the named product is obtained.

EXAMPLE 20

2,6α-dimethyl-11β,17α,21-trihydroxypregna-1,4-dien-20-one (a) 2,6α - dimethyl - 3ξ,11β,17α,21 - tetrahydroxypregna - 1,4 - dien - 20 - one, 20 ethylene ketal.—2,6α-dimethyl - 11β,17α,21 - trihydroxypregna - 1,4 - dien-3,20-dione, 20-ethylene ketal [Allen, Kissman, Maner, Ringler and Weiss, J. Med. Pharm. Chem., 5, 133 (1962)] is treated with aluminum hydride in the cold according to the procedure of Example 10 and the named intermediate is obtained.

(b) 2,6α - dimethyl - 11β,17α,21 - trihydroxypregna-1,4-dien-20-one, 20-ethylene ketal.—The intermediate of step (a) is treated with lithium in liquid ammonia according to the procedure of Example 10 and the named product is obtained.

(c) 2,6α - dimethyl - 11β,17α,21 - trihydroxypregna-1,4-dien-20-one.—The ketal of step (b) is heated with sulfuric acid according to the procedure of Example 11 and the named product is obtained.

EXAMPLE 21

9α-fluoro-6α-methyl-11β,17α,21-trihydroxy pregna-1,4-dien-20-one (a) 9α - fluoro - 6α - methyl - 3ξ,11β,17α,21 - tetrahydroxypregna - 1,4 - dien - 20 - one, 20 - ethylene ketal.—21 - acetoxy - 9α - fluoro - 6α - methyl - 11β,17α-dihydroxypregna - 1,4 - dien - 3,20 - dione, 20 - ethylene ketal [prepared by treating the corresponding 11-keto compound of Allen, Kissman, Maner, Ringler and Weiss, J. Med. Pharm. Chem., 5, 133 (1962) with sodium borohydride] is treated with aluminum hydride in the cold according to the procedure of Example 10 and the named intermediate is obtained.

(b) 9α - fluoro - 6α - methyl - 11β,17α,21 - trihydroxypregna - 1,4 - dien - 20 - one, 20 - ethylene ketal.—The intermediate of step (a) is treated with lithium in liquid ammonia according to the procedure of Example 10 and the named product is obtained.

(c) 9α - fluoro - 6α - methyl - 11β,17α,21 - trihydroxypregna-1,4-dien-20-one.—The ketal of step (b) is heated with sulfuric acid according to the procedure of Example 11 and the named product is obtained.

EXAMPLE 22

9α-fluoro-11β,17α,21-trihydroxypregna-1,4-dien-20-one (a) 9α - fluoro - 3ξ,11β,17α,21 - tetrahydroxypregna-1,4 - dien - 20 - one, 20 - ethylene ketal.—9α - fluoro-11β,17α,21 - trihydroxypregna - 1,4 - dien - 3,20 - dione, 20-ethylene ketal [Allen, Kissman, Manner, Ringler and Weiss, J. Med. Pharm. Chem., 5, 133 (1962)] is treated with aluminum hybride in the cold according to the procedure of Example 10 and the named intermediate is obtained.

(b) 9α - fluoro - 11β,17α,21 - trihydroxypregna - 1,4-dien-20-one, 20-ethylene ketal.—The intermediate of step (a) is treated with lithium in liquid ammonia according to the procedure of Example 10 and the named product is obtained.

(c) 9α - fluoro - 11β,17α,21 - trihydroxypregna - 1,4-dien-20-one.—The ketal of step (b) is heated with sulfuric acid according to the procedure of Example 11 and the named product is obtained.

EXAMPLE 23

17α,21-dihydroxypregna-1,4-diene-11,20-dione (a) 11β,20 - dihydroxy - 17α,21 - isopropylidenedioxy-1,4-pregnadien-3-one.—A stirred solution of 4.5 g. of 11β - hydroxy - 17α,21 - isopropylideneoxypregnadiene-3,20-dione [Tanabe and Bigley, J. Am. Chem. Soc., 83, 756 (1961)] in 200 ml. of methanol is cooled in an ice bath and 425 mg. of sodium borohydride is added. The ice bath is removed and stirring is continued for 2 hours. The product, 4.3 g., is collected by filtration after 75 ml. of water has been added and most of the methanol has been removed by vacuum evaporation.

(b) 3ξ,11β,20 - trihydroxy - 17α,21 - isopropylidenedioxypregna-1,4-diene.—To a stirred suspension of 2.28 g. of lithium aluminum hydride in 205 ml. of ether at 0° C. is added 2.39 g. of aluminum chloride. Ater one hour the mixture is filtered and the filtrate is added during one hour to a stirred solution of 3.8 g. of the compound of step (a) in 190 ml. of tetrahydrofuran at —10° C. The reaction mixture is stirred for one hour, ethyl acetate is added dropwise and the stirring continued at room temperature for an additional one-half hour. A saturated solution of sodium sulfate is added until the resulting precipitate gels and adheres to the side of the flask. The supernatant is removed by filtration, the gel washed with ethyl acetate and added to the supernatant. Vacuum evaporation yields the product as a residue.

(c) 11β,20 - dihydroxy - 17α,21 - isopropylidenedioxypregna-1,4-diene.—The product of step (b) in 68 ml. of tetrahydrofuran containing 22 ml. of 1 methoxy-2-propanol is added, with stirring, to 950 ml. of distilled liquid ammonia. Lithium, 336 mg., is added piecemeal until the blue color persists for five minutes. Enough water is added to discharge the blue color, then lithium is again added until the blue color persists for five minutes. The blue color is discharged by the addition of solid ammonium chloride, water is added and the mixture is extracted with chloroform. The extract is washed with water and dried over sodium sulfate. Vacuum evaporation produces an oil which is chromographed on a column and eluted with benzene. The product is recrystallized from acetone.

(d) 17α,21 - isopropylidenedioxypregna - 1,4 - diene-11,20-dione.—The product of step (c) is oxidized with chromic oxide in pyridine according to the procedure of Example 15 and the named compound is obtained.

(e) 17α,21 - dihydroxypregna - 1,4 - diene - 11,20-dione.—The product of step (d) is hydrolyzed with hydrochloric acid and isolated by the procedure of Example 4 to give the named compound.

We claim:
1. A 1,4-diene compound of the formula:

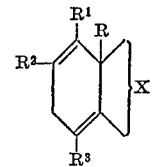

wherein
R is methyl;
R¹ and R³ are hydrogen;
R² is hydrogen or methyl; and
X is an organic radical selected from

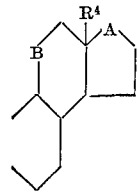

wherein
R⁴ is methyl;
A is a divalent linkage selected from ketalized carbonyl,

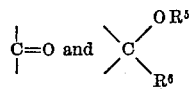

R⁵ being hydrogen or an acyl radical or an organic carboxylic acid having from 1 to 18 carbon atoms and R⁶ is hydrogen, lower alkyl, lower alkenyl, lower alkynyl or chloro lower alkynyl; and B is a divalent linkage selected from

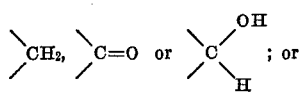 ; or

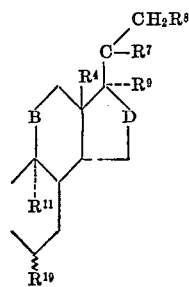

wherein
R⁴ and B are as hereinabove defined;
D is a divalent linkage selected from

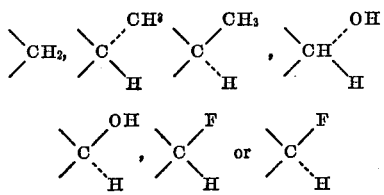

R⁷ is keto, H(OH) or H(OR¹²), R¹² being a hydrocarbon acyl group of up to 18 carbon atoms;

R⁸ and R⁹, independently, are hydrogen, hydroxyl or a hydrocarbon carboxylic acyloxy group of up to 18 carbon atoms; R¹⁰ is hydrogen or methyl; R¹¹ is hydrogen or fluorine; and 20-(lower alkylene)ketal derivatives of said compounds wherein R⁷ is keto, 17α,21-(lower)alkylenedioxy derivatives of said compounds wherein R⁸ and R⁹ are hydroxy, and 17α,20;20,21-bis-(lower(alkylene dioxy)) derivatives of said compounds wherein R⁸ and R⁹ are hydroxy and R⁷ is keto.

2. A compound as defined in claim 1 of the formula:

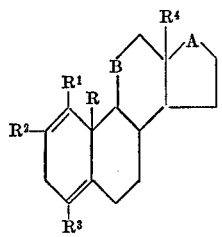

wherein
R⁴ is methyl;
R² is hydrogen or methyl; and
A is a divalent linkage selected from ketalized carbonyl

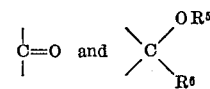

R⁵ being hydrogen or an acyl radical of an organic carboxylic acid having from 1 to 18 carbon atoms and R⁶ is hydrogen, lower alkyl, lower alkenyl, lower alkynyl or chloro lower alkynyl; and B is a divalent linkage selected from

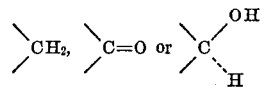

3. A compound as defined in claim 2 which is 17β-hydroxyandrosta-1,4-diene.
4. A compound as defined in claim 2 which is androsta-1,4-dien-17-one 17-ethylene ketal.
5. A compound as defined in claim 2 which is androsta-1,4-dien-17-one.
6. A compound as defined in claim 2 which is 17-α-ethynyl-17β-hydroxyandrosta-1,4-diene.
7. A compound as defined in claim 2 which is 17α-chloroethynyl-17β-hydroxyandrosta-1,4-diene.

8. A compound as defined in claim 1 which is of the formula:

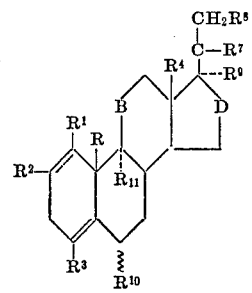

wherein
R is methyl;
R¹ and R³ are hydrogen;
R² is hydrogen or methyl; and
R⁴ is methyl;
B is a divalent linkage selected from

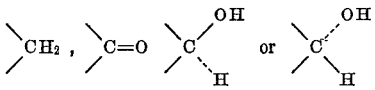

D is a divalent linkage selected from

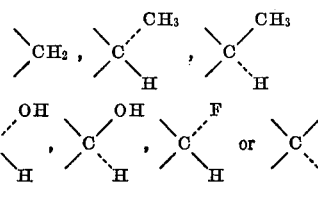

R⁷ is keto, H(OH) or H(OR¹²),
R¹² being a hydrocarbon carboxylic acyl group of up to 18 carbon atoms;
R⁸ and R⁹, independently, are hydrogen, hydroxyl or a hydrocarbon carboxylic acyloxy group of up to 18 carbon atoms
R¹⁰ is hydrogen or methyl;
R¹¹ is hydrogen or fluorine; and 20-(lower)alkylene ketal derivatives of said compounds wherein R⁷ is keto, 17α,21-(lower)alkylenedioxy derivatives of said compounds wherein R⁸ and R are hydroxy, and 17α,20; 20,21 - bis[(lower)alkylene dioxy]derivatives of said compound wherein R⁸ and R⁹ are hydroxy and R⁷ is keto.

9. A compound as defined in claim 8 which is 17α,20;20,21 - bis-(methylenedioxy)-11β-hydroxypregna-1,4-diene.

10. A compound as defined in claim 8 which is 11β,17α,21-trihydroxypregna-1,4-dien-20-one.

11. A compound as defined in claim 8 which is 21-hydroxypregna-1,4-dien-20-one 20-ethylene ketal.

12. A compound as defined in claim 8 which is 21-hydroxypregna-1,4-dien-20-one.

13. A compound as defined in claim 8 which is 17α,21-dihydroxypregna-1,4-dien-20-one, 20-ethylene ketal.

14. A compound as defined in claim 8 which is 17α,21-dihydroxypregna-1,4-dien-20-one.

15. A compound as defined in claim 8 which is 20ξ-hydroxypregna-1,4-diene.

16. A compound as defined in claim 8 which is pregna-1,4-dien-20-one.

17. A compound as defined in claim 8 which is 9α-fluoro - 16α - methyl-17α,20;20,21-bis(methylenedioxy)-11β-hydroxypregna-1,4-diene.

18. A compound as defined in claim 8 which is 9α-fluoro - 16α - methyl - 11β,17α,21 - trihydroxypregna-1,4-dien-20-one.

19. A compound as defined in claim 11 which is 9α-fluoro-11β,16α,17α-21-tetrahydroxypregna - 1,4 - dien-20-one.

20. A compound as defined in claim 8 which is 6α-methyl-11β,17α,21-trihydroxypregna-1,4-dien-20-one.

21. A compound as defined in claim 8 which is 2,6α-dimethyl-11β,17α,21-trihydroxypregna-1,4-diene-20-one.

22. A compound as defined in claim 8 which is 9α-fluoro - 6α - methyl-11β,17α,21-trihydroxypregna-1,4-dien-20-one.

23. A compound as defined in claim 8 which is 9α-fluoro-11β,17α,21-trihydroxypregna-1,4-dien-20-one.

24. A compound as defined in claim 8 which is 9α-fluoro - 11β - hydroxy - 17α,20;20,21-bis(methylenedioxy)pregna-1,4-diene.

25. A process for the preparation of a 1,14-diene compound as defined in claim 1, which comprises selectively directly cleaving the 3-ol group in a 1,4-dien-3-ol compound of the formula:

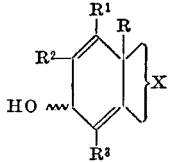

wherein
R is methyl,
R¹ and R³ are hydrogen,
R² is hydrogen or methyl; and
X is an organic radical selected from

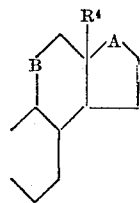

wherein
R⁴ is methyl,
A is a divalent linkage selected from ketalized carbonyl,

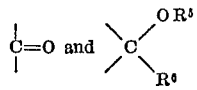

R⁵ being hydrogen or an acyl radical of an organic carboxylic acid having from 1 to 18 carbon atoms and R⁶ is hydrogen, lower alkyl, lower alkenyl, lower alkynyl or chloro lower alkynyl; and
B is a divalent linkage selected from

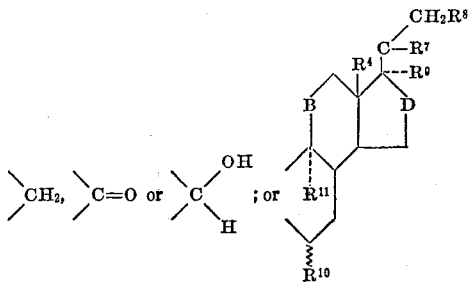

wherein
R⁴ and B are as hereinabove defined;
D is a divalent linkage selected from

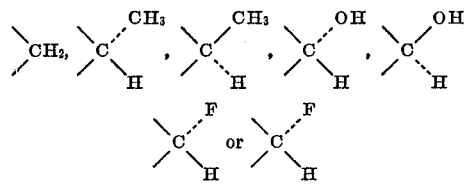

R⁷ is keto, H(OH) or H(OR¹²), R¹² being a hydrocarbon acyl group of up to 18 carbon atoms;
R⁸ and R⁹, independently, are hydrogen, hydroxyl or a hydrocarbon carboxylic acyloxy group of up to 18 carbon atoms; R¹⁰ is hydrogen or methyl; R¹¹ is hydrogen or fluorine; and 20-(lower alkylene) ketal derivatives of said compounds wherein R⁷ is keto, 17α, 21-(lower)alkylenedioxy derivatives of said compounds wherein R⁸ and R⁹ are hydroxy, and 17α,20;20,21 - bis(lower(alkylenedioxy)) derivatives of said compounds wherein R⁸ and R⁹ are hydroxy and R⁷ is keto with lithium in the presence of a solvent which is liquid ammonia or ethylamine.

26. The process as defined in claim 25 wherein 17α-hydroxyandrosta-1,4-diene is prepared from 3ξ,17α-hydroxyandrosta-1,4-diene.

27. A process for the preparation of a 1,4-diene compound as defined in claim 1, which comprises (a) acylating the 3-ol group in a 1,4-dien-3-ol compound of the formula:

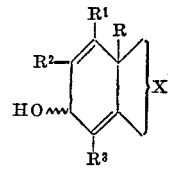

wherein
R is methyl,
R¹ and R³ are hydrogen
R² is hydrogen or methyl; and
X is an organic radical selected from

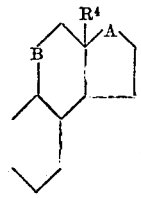

wherein
R⁴ is methyl;
A is a divalent linkage selected from ketalized carbonyl,

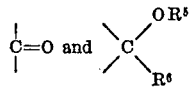

R⁵ being hydrogen or an acyl radical of an organic carboxylic acid having from 1 to 18 carbon atoms and R⁶ is hydrogen, lower alkyl, lower alkenyl, lower alkynyl or chloro lower alkynyl; and
B is a divalent linkage selected from

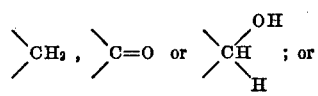

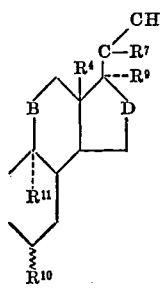

wherein
R⁴ and B are as hereinabove defined;
D is a divalent linkage selected from

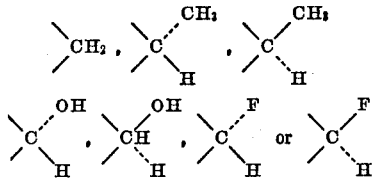

R⁷ is keto, H(OH) or H(OR¹²), R¹² being a hydrocarbon acyl group of up to 18 carbon atoms;
R⁸ and R⁹, independently, are hydrogen, hydroxyl or a hydrocarbon carboxylic acryloxy group of up to 18 carbon atoms;
R¹⁰ is hydrogen or methyl;
R¹¹ is hydrogen or fluorine; and 20-(lower alkylene) ketal derivatives of said compounds wherein R⁷ is keto, 17α,21-(lower)alkylenedioxy derivatives of said compounds wherein R⁸ and R⁹ are hydroxy, and 17α,20;20,21-bis-(lower(alkylene) dioxy)) derivatives of said compounds wherein R⁸ and R⁹ are hydroxy and R⁷ is keto to form a 3-acyloxy compound of the formula

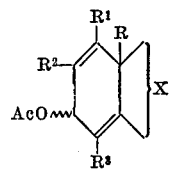

wherein R, R¹, R², R³ and X are as above defined and Ac is an acyl group and (b) reductively cleaving the 3-acyloxy group in said compound with lithium in the presence of a solvent which is liquid ammonia or ethylamine.

28. A process as defined in claim 27 wherein 17β-hydroxyandrosta-1,4-diene is prepared from 3ξ,17β-diacetoxyandrosta-1,4-diene.

29. A compound of the formula

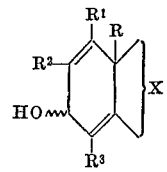

wherein
R is methyl,
R¹, and R³ are hydrogen,
R² is hydrogen or methyl; and
X is

[structure with CH₂R⁸, C—R⁷, R⁴, R⁹, B, D, R¹¹, R¹⁰]

wherein
D is a divalent linkage selected from

[structures showing CH₂, CH₃, OH, F substituents]

R⁷ is ketalized carbonyl or H(OH);
R⁸ and R⁹ are hydrogen or hydroxyl;
R¹⁰ is hydrogen or methyl; and
R¹¹ is hydrogen or fluorine;
R⁴ is methyl, and
B is a divalent linkage selected from ketalized carbonyl,

[structures]

30. A compound which is 3ξ,17α,21-trihydroxypregna-1,4-dien-20-one in the form of a 20 cyclic ethylene ketal.

31. A compound which is 9α-fluoro-16α-methyl-3ξ,11β,17α,21-tetrahydroxypregna-1,4-dien-20-one in the form of the 17α,20;20,21-bis(methylenedioxy)derivative thereof.

32. A compound which is 9α-fluoro-3ξ,11β,17α,21-tetrahydroxypregna-1,4-diene in the form of a 17α,20;20,21-bis(methylenedioxy) derivative thereof.

33. A process for the preparation of a 1,4-diene-3-ol compound as defined in claim 31 which comprises selectively reducing a 1,4-diene-3-one of the formula

[structure]

wherein

R is methyl;
R$^1$ and R$^3$ are hydrogen;
R$^2$ is hydrogen or methyl; and
X is an organic radial selected from

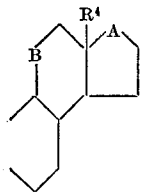

wherein

R$^4$ is methyl;
A is a divalent linkage selected from ketalized carbonyl,

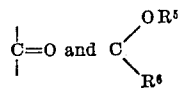

R$^5$ being hydrogen or an acyl radical of an organic carboxylic acid having from 1 to 18 carbon atoms and R$^6$ is hydrogen, lower alkyl, lower alkenyl, lower alkynyl or chloro lower alkynyl; and
B is a divalent linkage selected from

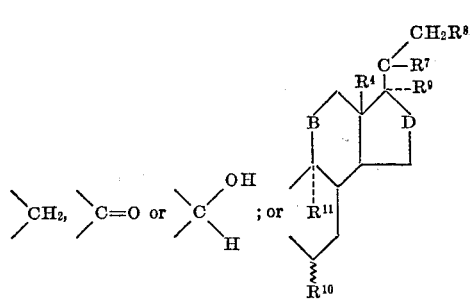

wherein

R$^4$ and B are hereinabove defined;
D is a divalent linkage selected from

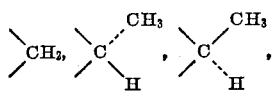

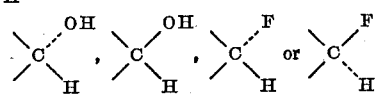

R$^7$ is keto, H(OH) or H(OR$^{12}$), R$^{12}$ being a hydrocarbon acyl group of up to 18 carbon atoms;
R$^8$ and R$^9$, independently, are hydrogen, hydroxyl or a hydrocarbon carboxylic acyloxy group of up to 18 carbon atoms;
R$^{10}$ is hydrogen or methyl;
R$^{11}$ is hydrogen or fluorine; and 20-(lower alkylene) ketal derivatives of said compounds wherein R$^7$ is keto, 17α,21-(lower)alkylenedioxy derivatives of said compounds wherein R$^8$ and R$^9$ are hydroxy, and 17α,20;20,21-bis-(lower (alkylene dioxy)) derivatives of said compounds wherein R$^8$ and R$^9$ are hydroxy and R$^7$ is keto, with aluminum hydride at a temperature of below about 10° C. until replacement of the 3-keto group by a 3-hydroxyl group is substantially complete, and recovering said compound.

34. A process for the preparation of a 1,4-diene compound as defined in claim 1, which comprises (a) selectively reducing the 3-one group in a 1,4-diene-3-one compound of the formula:

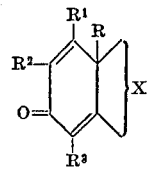

wherein

R is methyl;
R$^1$ and R$^3$ are hydrogen;
R$^2$ is hydrogen or methyl; and
X is an organic radical selected from

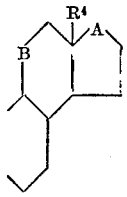

wherein

R$^4$ is methyl;
A is a divalent linkage selected from ketalized carbonyl,

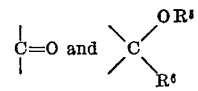

R$^5$ being hydrogen or an acyl radical of an organic carboxylic acid having from 1 to 18 carbon atoms and R$^6$ is hydrogen, lower alkyl, lower alkenyl, lower alkynyl or chloro lower alkynyl; and
B is a divalent linkage selected from

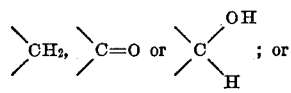

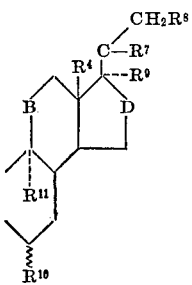

wherein R$^4$ and B are as hereinabove defined; D is a divalent linkage selected from

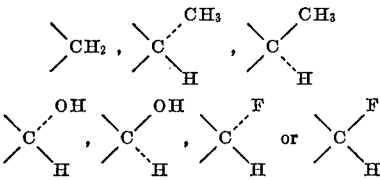

R$^7$ is keto, H(OH) or H(OR$^{12}$), R$^{12}$ being a hydrocarbon acyl group of up to 18 carbon atoms; R$^8$ and R$^9$, independently, are hydrogen, hydroxyl or a hydrocarbon, carboxylic acyloxy group of up to 18 carbon atoms; R$^{10}$ is hydrogen or methyl; R$^{11}$ is hydrogen or fluorine; and 20-(lower alkylene) ketal derivatives of said compounds wherein $R^7$ is keto, $17\alpha,21$-(lower)alkylenedioxy derivatives of said compounds wherein $R^8$ and $R^9$ are hydroxy, and $17\alpha,20;20,21$ - bis - [lower(alkylene dioxy)] derivatives of said compounds wherein $R^8$ and $R^9$ are hydroxy and $R^7$ is keto with aluminum hydride at a temperature of from about 10° C. to about 30° C. until formation of a mixture the corresponding 1,4-diene, 2,4-diene and 1,3-diene compounds is substantially complete;

(b) treating said 1,4-diene compound admixed with said 2,4- and 1,3-diene by-products with lithium in liquid ammonia whereby said by-products are reduced to monoenes; and (c) crystallizing the mixture to recover the said 1,4-diene substantially free of the reduced by-products.

References Cited

UNITED STATES PATENTS 2,878,267  3/1959  Szpilfogel et al. ____ 260—397.3

OTHER REFERENCES

Djerassi, Steroid Reactions, Holden-Day, Inc., 1963, p. 144.

The Merck Index, 7th edition, p. 612.

LEWIS GOTTS, Primary Examiner

E. G. LOVE, Assistant Examiner

U.S. Cl. X.R.

260—239.5, 397.1, 397.3, 397.4, 397.45, 397.5; 397.47, 999